Dec. 6, 1960 S. C. W. WILKINSON 2,963,394
JOINING OF ELEMENTS COMPOSED OF PLASTIC MATERIALS
Filed Oct. 7, 1957 2 Sheets-Sheet 1

INVENTOR
SAMUEL C. W. WILKINSON
BY Wenderoth, Lind & Ponack
ATTORNEYS

United States Patent Office 2,963,394
Patented Dec. 6, 1960

2,963,394

JOINING OF ELEMENTS COMPOSED OF PLASTIC MATERIALS

Samuel C. W. Wilkinson, Cookham Village, England, assignor to Crane Packing Limited, Slough, England, a British company Filed Oct. 7, 1957, Ser. No. 688,700

Claims priority, application Great Britain Oct. 19, 1956

10 Claims. (Cl. 154—116)

This invention relates to the joining together of elements composed of synthetic plastic materials and has for its object a method of welding plastic materials, which is particularly suited to the manipulation of polytetrafluoroethylene, though it may also be applied to similar plastic materials.

With this object in view the invention provides an improved method of welding synthetic plastic materials, such as polytetrafluoroethylene, for the purpose of inseparably connecting two elements of such material when one element embraces the other, as in the plugging or jointing of plastic pipes, which comprises the step of applying restraining means around the one element which embraces the other and then raising the temperature of the restrained assembly above the transition point of the material if both elements are of the same material, or the lower transition point in the case of two different materials so as to utilise the expansion of the restrained assembly to weld the two plastic elements together.

The above described method may be carried into effect by confining two pieces of weldable plastic material, such as two pieces of the same kind of plastic material, for example, polytetrafluoroethylene (PTFE), within a sheathing having a coefficient of expansion less than the materials to be welded together, and then raising the pieces to a temperature above the transition point of the material. The expression "transition point" means that point during heating of the plastic material above which a pressure weld may be effected. In the case of polytetrafluoroethylene the transition point is at about 327° C., at which temperature the normal wax-like translucent condition of the material changes to a transparent gel, the change being accompanied by appreciable expansion. A weld is thereby effected because of the plastic material expanding so that a high loading on the contact surface is obtained whilst the material is at an elevated temperature. The sheathing may comprise a sleeve, such as a length of solid metal tubing, or a sleeve consisting of tightly coiled metal wire.

Figure 1:
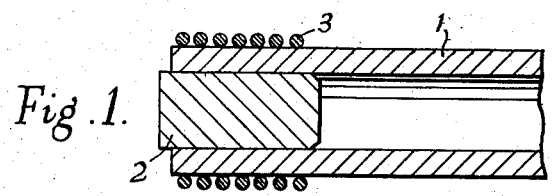
Fig. 1 is a sectional elevation view of a plastic pipe with a plug in position therein prior to the step of heating.
Figure 2:
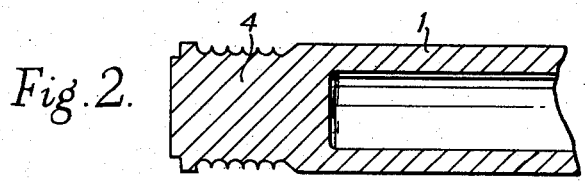
Fig. 2 is a sectional elevation view of the plastic pipe of Fig. 1 after heating.

By way of example, Figures 1 and 2 of the accompanying drawings illustrate two stages in the plugging of a plastic pipe. The end of a piece of PTFE pipe 1 (Figure 1) is plugged with a short rod 2 of solid PTFE, which is a sliding fit in the bore of the pipe. The outside of the pipe is then bound round with a coil of wire 3 over a distance slightly shorter than the length of the plug. The wire coil 3 is shown in Figure 1 as an open wound coil, but if desired the coil may be closed wound, that is, with the convolutions of the coil in actual contact or in close proximity.

The plugged pipe 1, together with the wire coil 3 (constituting the restraining means referred to) surrounding the pipe end is then placed in an oven and raised to a temperature of about 360° C. The assembly is then removed from the oven, allowed to cool, and the wire coil 3 is removed. This results in the formation of a plugged end 4 in the pipe 1 as illustrated in Figure 2.

Figure 3:
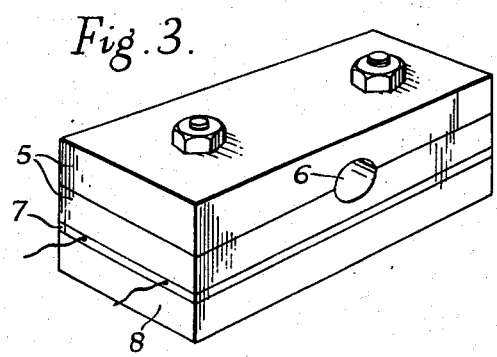
Fig. 3 is a perspective of an electrically heated mechanical clamp which can be used in the method according to the present invention.

In the absence of an oven, a similar plugged pipe end can be obtained by using a simple mechanical clamp, which is electrically heated. A suitable clamp is illustrated in Figure 3, where a pair of clamp plates 5 are channeled so as to constitute a hole 6 to receive the restrained pipe end, an electrical resistance heater 7 being clamped between a base plate 8 and one of the clamp plates 5.

Figure 4:
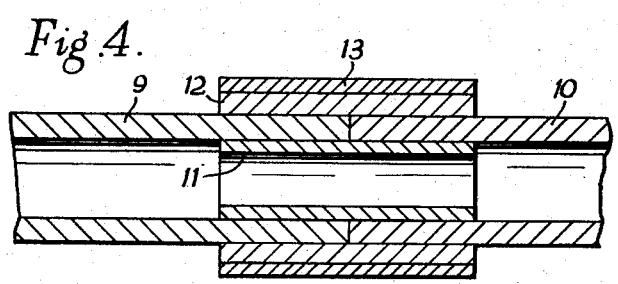
Fig. 4 is a sectional elevation view of an arrangement of plastic pipes and inserts therefor prior to a joining operation.

The joining of pipe ends may be achieved in a similar manner as indicated in Figure 4. The aligned bores of the two pipes 9, 10 to be joined are supported by an insert 11, which may be a short length of glass or metal tube. A muff or sleeve 12 of PTFE is fitted over the tube ends, and around this muff is applied external confining means which may take the form of a coil of wire as in Figure 1, or a metal sleeve 13 as indicated. The assembly is then heated in an oven to a temperature of the order of about 360° C. and allowed to cool, the metal sleeve 13 and the internal support or insert 11 being then removed. If the insert 11 is made of glass, a sharp blow with a hammer will shatter the glass insert and the broken pieces can be blown out of the tube by compressed air. If the insert 11 is made of metal, it may be removed by using a suitable corrosive medium, such as a strong corrosive acid, or pushed out with a rod in the case of short tubes. A clamp, such as illustrated in Figure 3, could be used in place of the metal sleeve or wire coil if it is necessary to join the pipes in situ.

Figure 5:
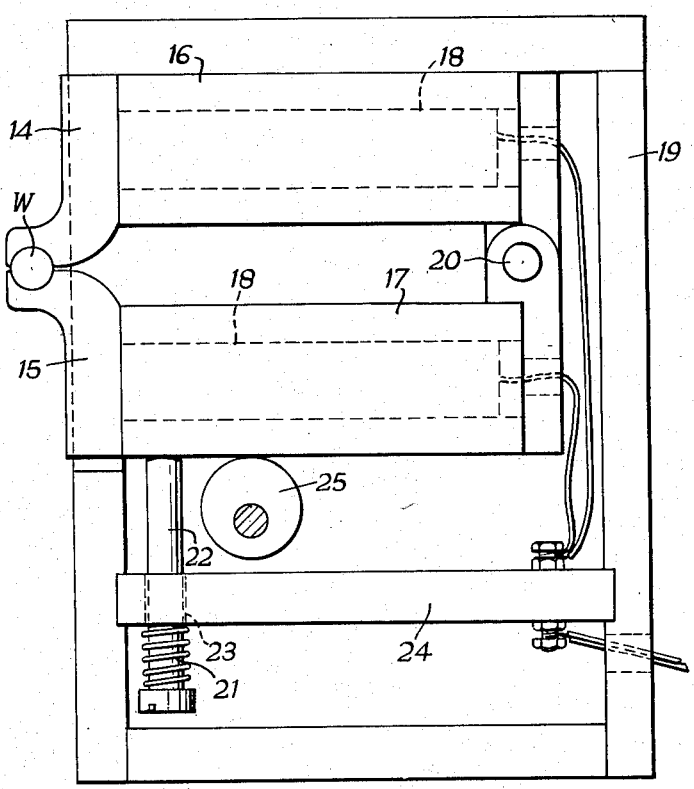
Fig. 5 is a side elevation view of an alternative form of clamp which can be used in the method according to the present invention.

An alternative form of welding clamp is shown diagrammatically in Figure 5, in which the assembly of workpieces W is clamped between suitably recessed jaws 14, 15 carried by relatively movable heater blocks 16, 17 respectively, each incorporating an electrical resistance heating element 18. The required relative movement may be secured, as shown, by fixedly mounting heater block 16 on a frame 19 and attaching the other block 17 to block 16 by a pivot connection 20. A spring 21 encircles a bolt 22 which is secured to block 17 and passes through an opening 23 in a cross member 24 of frame 19, said spring 21 bearing against the cross member 24 to bias the hinged block 17 to the open position. The block 17 is swung upon pivot 20 to close jaws 14, 15 around the workpiece assembly W by pressure applied through an eccentric or cam 25 operable by a suitable lever handle (not shown).

I claim:

1. A method of inseparably connecting two elements of weldable synthetic plastic material which consists essentially of the steps of assembling one said element to embrace the other element, applying restraining means around said one element which embraces the other and then raising the temperature of the restrained assembly above the point at which expansion takes place, whereby expansion of the restrained assembly welds the two plastic elements together.

2. A method of inseparably connecting two pieces of weldable plastic materials of the same kind consisting essentially of the steps of sleeving one piece with the other, confining the sleeved pieces with a sheathing having a coefficient of expansion less than the material to be welded together and then raising the pieces to a temperature above the transition point of the materials to utilize the constraining effect of said sheathing to weld said pieces together.

3. A method as claimed in claim 2, wherein one at least of the pieces to be welded together is composed of polytetrafluoroethylene.

4. A method as claimed in claim 2, in which the confining sheathing comprises a sleeve of solid metal tubing.

5. A method as claimed in claim 2, wherein additional restraint is secured by heating the confined material within a close fitting clamp during the heating process.

6. A method as claimed in claim 2 applied to joining two tubes in coaxial relationship, characterised by the step of covering the abutting ends of said tubes with a muff of material weldable to said tubes, the confining sheathing being then applied around said muff.

7. A method as claimed in claim 6, further characterised in that the abutting coaxial tubes are internally supported by a removable insert.

8. A method as claimed in claim 2 in which the confining sheathing comprises a sleeve consisting of tightly coiled metal wire.

9. A method of welding together two elements composed of synthetic plastic materials having high thermal expansion commencing at different temperatures, which consists essentially of the steps of assembling one said element to embrace the other, applying restraining means around said one element which embraces the other and then raising the temperature of the restrained assembly above the point at which one of the materials commences to expand to thereby weld the materials together by the combined pressure resulting from the pressure which accompanies expansion and the counterpressure due to the restraining means.

10. A method of welding together two telescopically fitting elements both composed of polytetrafluoroethylene, consisting essentially of the steps of tightly ensleeving the outer of said telescoped elements in a metal sheathing having a coefficient of expansion less than that of polytetrafluoroethylene and heating the sheathed elements to raise them to a temperature of about 327° C. thereby causing said elements to be welded together under the reactive pressure of said sheathing.

References Cited in the file of this patent

UNITED STATES PATENTS

| | | |
|---|---|---|
| 1,990,077 | Kershaw | Feb. 5, 1935 |
| 2,503,882 | Medford | Apr. 11, 1950 |
| 2,638,429 | Patterson | May 12, 1953 |
| 2,667,865 | Herman | Feb. 2, 1954 |
| 2,739,829 | Pedlow et al. | Mar. 27, 1956 |
| 2,930,634 | Merritt | Mar. 29, 1960 |

FOREIGN PATENTS

| | | |
|---|---|---|
| 26,644 | Great Britain | 1898 |
| 652,054 | Great Britain | Apr. 18, 1951 |

OTHER REFERENCES

Modern Plastics, November 1956, "Resistance Welded Plastic Pipe Joints," pages 150–151.